Figure 1:
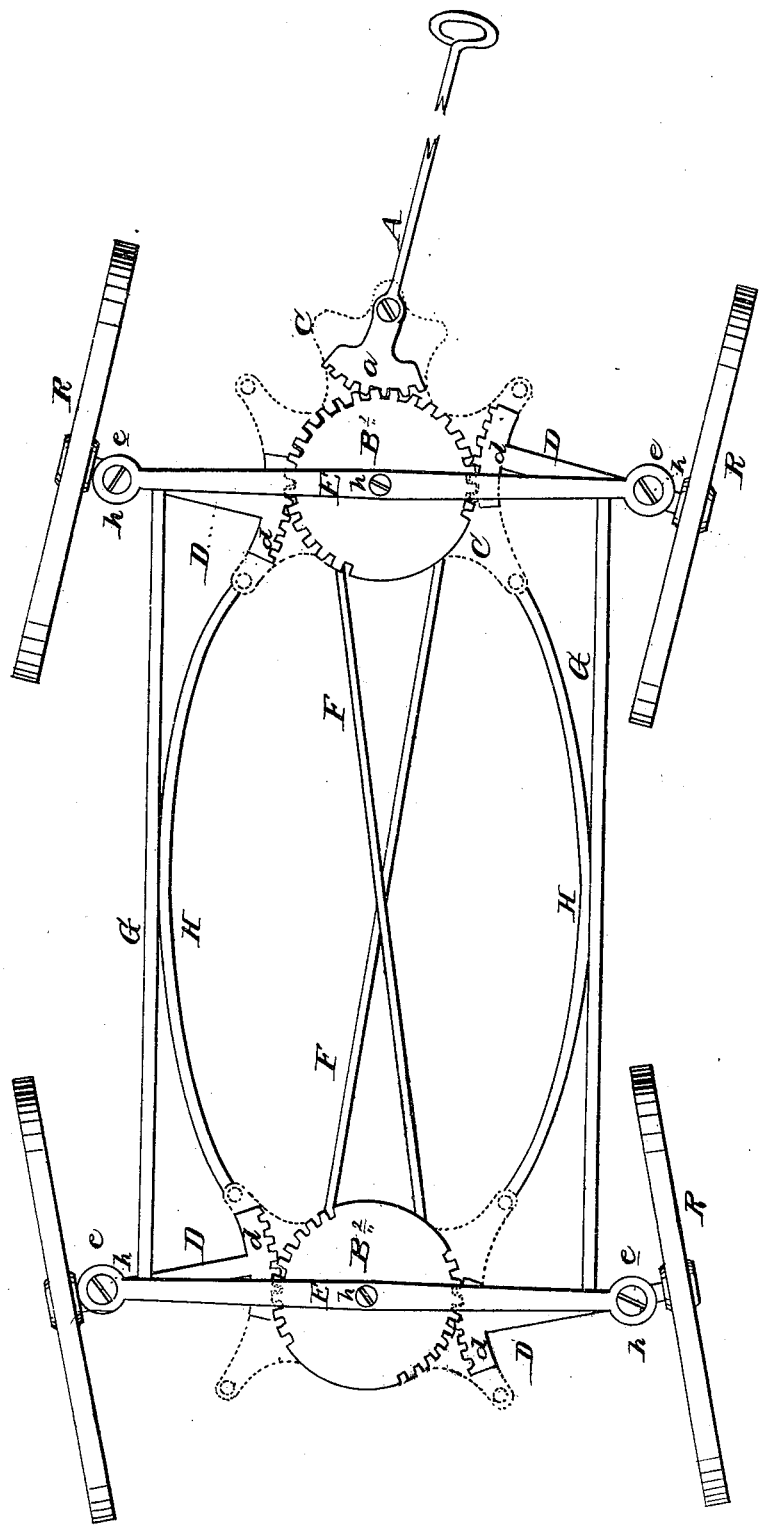

2 Sheets—Sheet 1.

J. PINE.
HOSE CARRIAGE.

No. 7,758. Patented Nov. 5, 1850.

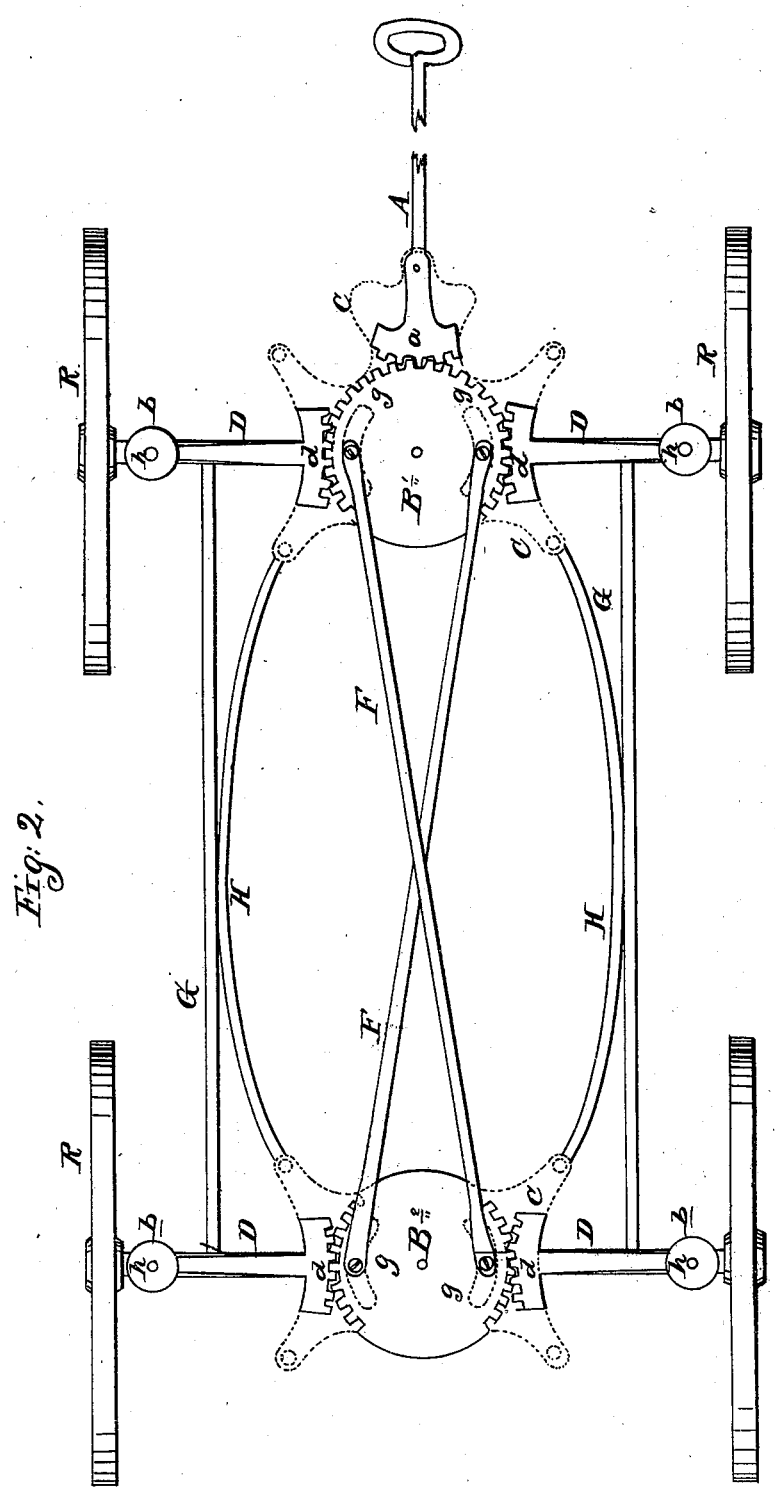

UNITED STATES PATENT OFFICE.

JOSEPH PINE, OF NEW YORK, N. Y., ASSIGNOR TO BENJAMIN PINE.

RUNNING-GEAR OF CARRIAGES.

Specification of Letters Patent No. 7,758, dated November 5, 1850.

*To all whom it may concern:*

Be it known that I, JOSEPH PINE, of the city, county, and State of New York, have invented a new and useful Improvement on Hose-Carriages or other Vehicles; and I hereby do declare that the following is a full, clear, and exact description, reference being had to the accompanying drawings, forming a part of this specification.

Figure 1, is a top view. Fig. 2, is a view of the underside.

The nature of my invention consists in providing the pole of the carriage with an interior rack on its inner end meshing into a central cog wheel which operates the axles on the front wheels—each of which has a rack on its inner end; also in combining the front central cog wheel with the hind central cog wheel by diagonal braces, which operate the axles of the hind wheels in unison with the motion of the front wheels, the whole being operated by the pole of the carriage to move the wheels to the requisite angles for turning the corners of streets abruptly and also for preventing the wheels from being turned out of their course unless operated by the pole of the carriage.

To enable others skilled in the art to make and use my invention, I will proceed to describe its construction and operation.

The same letters on the above mentioned figures indicate like parts.

The wheels of the carriage are made in the usual way. A is the pole of the carriage. It is made with a rack $a$, on its inner end. $B^1$ is a front cog wheel secured between a top and bottom plate of metal, $c$, $c$, indicated by the dotted lines in Figs. 1 and 2, to show the wheel and the racks. These two metal plates also secure the inner end of the pole A, to mesh into and operate the wheel $B^1$ as represented.

Each wheel has a separate axle D, which is made with a rack $d$ on its inner end meshing into the front cog wheel $B^1$ and also into the hind cog wheel $B^2$.

Each axle has a boss, $b$, made on it, with a hole drilled or cast through it.

E, is a metal bar fitted across the top of the upper plate C Fig. 1. This bar has three holes drilled or cast in it, one above the exact center of the wheel $B^1$ and one through each bush, $e$, at the ends of the bar. In each of these holes in the bar E there is inserted a vertical screw axle $h$ on which the wheels $B^1$ and $B^2$, and the axles D move as represented in Fig. 1. The axles D of the running wheels R are placed in them in the usual manner.

The hind axles and the hind cog wheel B are arranged and constructed like those on the front wheels only there are no cogs on $B^2$ for the pole like $B^1$. The hind and front wheels are connected together as follows:

F F, are diagonal metal braces firmly secured by screw bolts into the under part of the front and hind cog wheels $B^1$ $B^2$ as represented in Fig. 2. These diagonal braces move the hind axles of the wheels R in unison with the motion of the front cog wheel $B^1$.

$g$, $g$, are curved openings in the under plate $c$, to allow the ends of the diagonal braces to move in their respective arcs when operated through the wheel $B^1$ by the pole A. G G are straight sleepers united in any of the known ways to the front and hind transverse bars E E. H H are two elliptical bearings firmly secured between the plates C C. These bearings or sleepers are permanent.

Operation: It is evident that the axles cannot be moved except the cog wheel $B^1$ is moved, as the racks effectually prevent such motion. It is equally evident that the wheel $B^1$ cannot be moved unless it is operated by the pole A of the carriage. When this carriage is drawn along, the wheels R R, will only move out of a straight line according as the pole A is moved, and the hind wheels R are instantaneous in their action to move in unison with the front wheels.

This principle applied to hose carriages possesses great advantages, as has been proven by experiments, both for a steady forward motion over rough pavements, and for turning rapidly around the corners of streets; qualities very essential in hose carriages.

Having thus explained my invention, I do not claim, a separate axle for each wheel, neither do I claim the diagonal braces for uniting the front or back axles; as these have been known before, but What I do claim is—

The axles of the wheels having racks on their inner ends meshing into central cog wheels, the front one of which meshes into a segmental rack on the inner end of the pole of the carriage; the whole being constructed arranged and operating in the manner substantially as described.

JOSEPH PINE.

Witnesses:
   O. D. MUNN,
   S. H. WALES.